(12) United States Patent
Ghosh

(10) Patent No.: US 11,250,384 B2
(45) Date of Patent: Feb. 15, 2022

(54) SURFACING ITEM HISTORY IN ELECTRONIC CALENDAR SYSTEMS

(71) Applicant: Microsoft Technology Licensing, LLC, Redmond, WA (US)

(72) Inventor: Kushal Ghosh, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 278 days.

(21) Appl. No.: 16/689,206

(22) Filed: Nov. 20, 2019

(65) Prior Publication Data
US 2021/0150487 A1 May 20, 2021

(51) Int. Cl.
| | |
|---|---|
| *G06F 16/23* | (2019.01) |
| *G06Q 10/10* | (2012.01) |
| *G06Q 10/06* | (2012.01) |
| *G06Q 10/02* | (2012.01) |
| *G06T 11/20* | (2006.01) |
| *H04L 12/58* | (2006.01) |

(52) U.S. Cl.
CPC ......... *G06Q 10/1093* (2013.01); *G06Q 10/02* (2013.01); *G06Q 10/06311* (2013.01); *G06Q 10/06314* (2013.01); *G06Q 10/107* (2013.01); *G06T 11/206* (2013.01); *G06F 16/23* (2019.01); *H04L 51/22* (2013.01)

(58) Field of Classification Search
CPC ......... G06F 16/23; G06T 11/206; H04L 51/22
See application file for complete search history.

(56) References Cited

U.S. PATENT DOCUMENTS

| | | | |
|---|---|---|---|
| 5,129,057 A | 7/1992 | Strope et al. | |
| 8,074,175 B2 | 12/2011 | Brush et al. | |
| 9,552,571 B2 | 1/2017 | Jain et al. | |
| 2007/0112926 A1 | 5/2007 | Brett et al. | |
| 2009/0100332 A1* | 4/2009 | Kanjilal | G06Q 10/107 715/235 |
| 2013/0036369 A1* | 2/2013 | Mitchell | G06Q 50/00 715/753 |

(Continued)

OTHER PUBLICATIONS

"Taleo Scheduling Center", Retrieved from: https://www.oracle.com/technetwork/fusion-apps/tsccfp12a-userguide-enus-1649496.pdf, Feb. 24, 2012, 61 Pages.

(Continued)

*Primary Examiner* — Andrea C Leggett
(74) *Attorney, Agent, or Firm* — Liang IP, PLLC

(57) ABSTRACT

Techniques of surfacing calendar item history in electronic calendar systems are disclosed herein. One example technique includes receiving a request for an history of a calendar item in the electronic calendar book of the user. The calendar item has an attribute including a start date/time, an end date/time, a location, a subject of discussion, a duration, a description, a list of attendees, or an attached document related to the calendar item. The technique further includes, in response to receiving the request, surfacing, on a graphical user interface having a first axis representing the attribute and a second axis representing time of assignment, first and second datapoints corresponding to first and second values of the attribute along the first axis and first and second times, along the first axis, at which the attribute acquired the first and second value, respectively.

20 Claims, 9 Drawing Sheets

(56) References Cited

U.S. PATENT DOCUMENTS

2014/0157177 A1\* 6/2014 Ghadge .............. G06Q 10/1093
 715/772
2015/0268823 A1 9/2015 Seuthe
2017/0124517 A1 5/2017 Martin
2021/0272069 A1\* 9/2021 Douglas .............. G06F 16/9038

OTHER PUBLICATIONS

"Track Updates in the Editing Environment", Retrieved from: https://web.archive.org/web/20170308045534/http:/www.trumba.com/help/calendars/updatespanel.aspx, Mar. 8, 2017, 4 Pages.
Thake, et al., "Get Incremental Changes to Events in a Calendar View", Retrieved from: https://docs.microsoft.com/en-us/graph/delta-query-events?tabs=http, Sep. 20, 2019, 12 Pages.

\* cited by examiner

SURFACING ITEM HISTORY IN ELECTRONIC CALENDAR SYSTEMS

BACKGROUND

Electronic calendars are software applications designed to provide users with an electronic version of a physical calendar. Such software applications typically provide an appointment book, an address book, and a contact list. For example, an electronic appointment book can provide functionalities such as transmitting electronic meeting invitations, receiving and notifying newly received meeting invitations, and user interfaces for accepting, rejecting, or proposing new date/time for received meeting invitations. Once a meeting invitation is accepted, the electronic appointment book can also save the meeting as a calendar item and track a current date/time in order to provide reminders for the scheduled meeting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electronic calendar systems can be configured to facilitate operations such as scheduling meetings, providing reminders, or performing other suitable calendar functions. A meeting organizer can utilize an electronic calendar system to generate and transmit electronic meeting invitations to meeting invitees via, for instance, emails. The meeting invitations can include a start date/time, an end date/time, a location, a subject of discussion, a duration, a description, a list of invitees, one or more attached documents, and/or other suitable meeting attributes. Upon acceptance of the meeting invitations, the electronic calendar system can create a meeting appointment with the meeting attributes as a calendar item in each meeting invitee's electronic appointment book.

Meeting appointments and other calendar items may be subject to updates from time to time. For instance, a meeting organizer can modify one or more of the meeting attributes of a scheduled meeting after the meeting invitees have accepted the meeting invitations. The meeting attendees can also propose modifications of the location, start date/time, end date/time, description, agenda, and/or other attributes of the scheduled meeting. Upon receiving the modifications, the electronic calendar system can generate and transmit to each of the meeting attendees a message regarding the meeting update reflecting the modified meeting attributes.

In certain electronic calendar systems, all meeting updates are transmitted as emails to each meeting attendee's inbox for action by the meeting invitees. Upon acceptance, the electronic calendar system can update the previous created calendar items in each meeting attendee's electronic calendar book. Such updating technique, however, can have certain drawbacks. For example, when a large number of updates have been sent/received, determining identities of attribute(s) that have changed, when such changes occurred, and a sequence of changes to the attribute(s) may be difficult to a meeting attendee. To sort out the large number of changes, the meeting attendee may manually browse through all of the incoming and outgoing update emails related to the scheduled meeting. Such manual browsing can be labor intensive, inefficient, and prone to errors due to, for instance, overlooking one or more updates.

Several embodiments of the disclosed technology can address at least some of the foregoing drawbacks by implementing an history engine in an electronic calendar system for tracking and graphically surfacing history of calendar items. The history engine can be configured to track one or more updates related to a calendar item such as a scheduled meeting or an appointment. For example, the history engine can be configured to track changes in one or more of subject, description, addition or removal of recipients, meeting start date/time, meeting end date/time, location, duration, or other attributes related to the calendar item. The history engine can also be configured to track a date/time when an initial meeting request and updates having the changes in one or more of the foregoing attributes are sent, received, or applied to the calendar item. The various tracked information can be stored as a database record in a database of the electronic calendar system or stored in other suitable forms and/or in other suitable locations.

Upon receiving a user input for a history of the calendar item, the history engine can be configured to retrieve a database record corresponding to the calendar item and surface a sequence of changes to attribute(s) of the calendar item on a user interface. In one embodiment, the history can be rendered and surfaced as symbols, words, or other suitable types of interface elements on a scatter plot with an x-axis representing time of assignment of values to the corresponding attributes and a y-axis representing values of the various attributes. For instance, the x-axis can have an origin of a reference date/time (e.g., "Jan. 1, 2019"). The y-axis can have the various attributes of the calendar item arranged along the y-axis. As such, datapoints on the scatter plot can each have a value of date/time along the x-axis at which a value is assigned to corresponding attributes along the y-axis.

In one implementation, the various values of the attributes can be represented by a star, a cross, an asterisk, a square, a circle, a triangle, or other suitable types of symbol. In another implementation, the various values can be represented by a letter. For example, "D" can be used for a description of the calendar item. "S" can be used for a subject. Lower case "d" can be used for a duration. "T" can be used for a date/time. "L" can be used for a location. In further implementations, the various values can also be represented by actual values or truncated values. For example, a shortened description can be used to represent the description of the calendar item. A time period (e.g., "1 HR") can be used to represent the duration. In yet further implementations, the various values can be represented using emojis, pictures, images, or other suitable user interface elements.

Based on the multiple values of the foregoing attributes in the retrieved database record, the history engine can plot multiple datapoints on the scatter plot corresponding the multiple values and values of date/time as initially assigned and when the values changed. For example, the history engine can plot a datapoint representing a start date/time attribute with a coordinate having an x-axis value of "Jan. 1, 2019" corresponding to a date at which an original value is assigned to the start date/time and a y-axis value corresponding to the start date/time (e.g., "Start Date/Time"). Later on, when the value of the start date/time of the meeting is changed at, for instance, "Jan. 8, 2019," the history engine can plot an additional datapoint on the scatter plot with a coordinate having an x-axis value of "Jan. 8, 2019" and a y-axis value corresponding to the new value of the start date/time attribute, i.e., "Start Date/Time." The history engine can also be configured to traverse the entire database record to determine if additional values of the same or different attributes have been detected. If additional values have been detected, the history engine can be configured to repeat the foregoing operations to plot additional datapoints on the scatter plot. Otherwise, the history engine can be configured to indicate that all of the values of the attributes have been represented. In other embodiments, the various values of the attributes can be surfaced as a histogram or other suitable types of diagrams.

In certain embodiments, the history engine can be configured to surface the datapoints representing the changes with different appearances based on whether a corresponding update email has been read, responded to, or otherwise processed by the user. For instance, in the example above related to a change in start date/time, if the user has not read the update email related to the change in start date/time, the history engine can be configured to represent the new value related to the start date/time in a bold face font, an underlined font, or other suitable types of font. In other examples, the history engine can also be configured to output additional symbols proximate to the surfaced additional datapoints. Examples of suitable symbols can include exclamation, question, or other suitable types of marks. In further embodiments, upon receiving an input (e.g., a click) on one of the surfaced additional datapoints, the history engine can locate and surface the corresponding update email to the user. Subsequent to detecting that the user has read the update email, the appearance of the originally surfaced additional datapoint on the scatter plot can be modified to indicate that the update email has been read.

Several embodiments of the disclosed technology can improve efficiencies in providing update information of calendar items to users by tracking various updates related to a calendar item and surface the tracked updates in, for instance, a graphical form on a user interface to users. When an update to a calendar item is detected, an additional datapoint can be surfaced and plotted on the graph to represent a value of the update and a date/time at which the update was received, transmitted, or applied to the calendar item. Thus, by iterating through all the updates to the calendar item, a complete history to the calendar item can be graphically represented to users. Such graphical representation can provide a direct and visual sequence of the various updates. As such, manually browsing through the update emails may be avoided. As a result, risks of errors such as overlooking one or more of the update emails may be reduced.

DETAILED DESCRIPTION

Figure 1A:
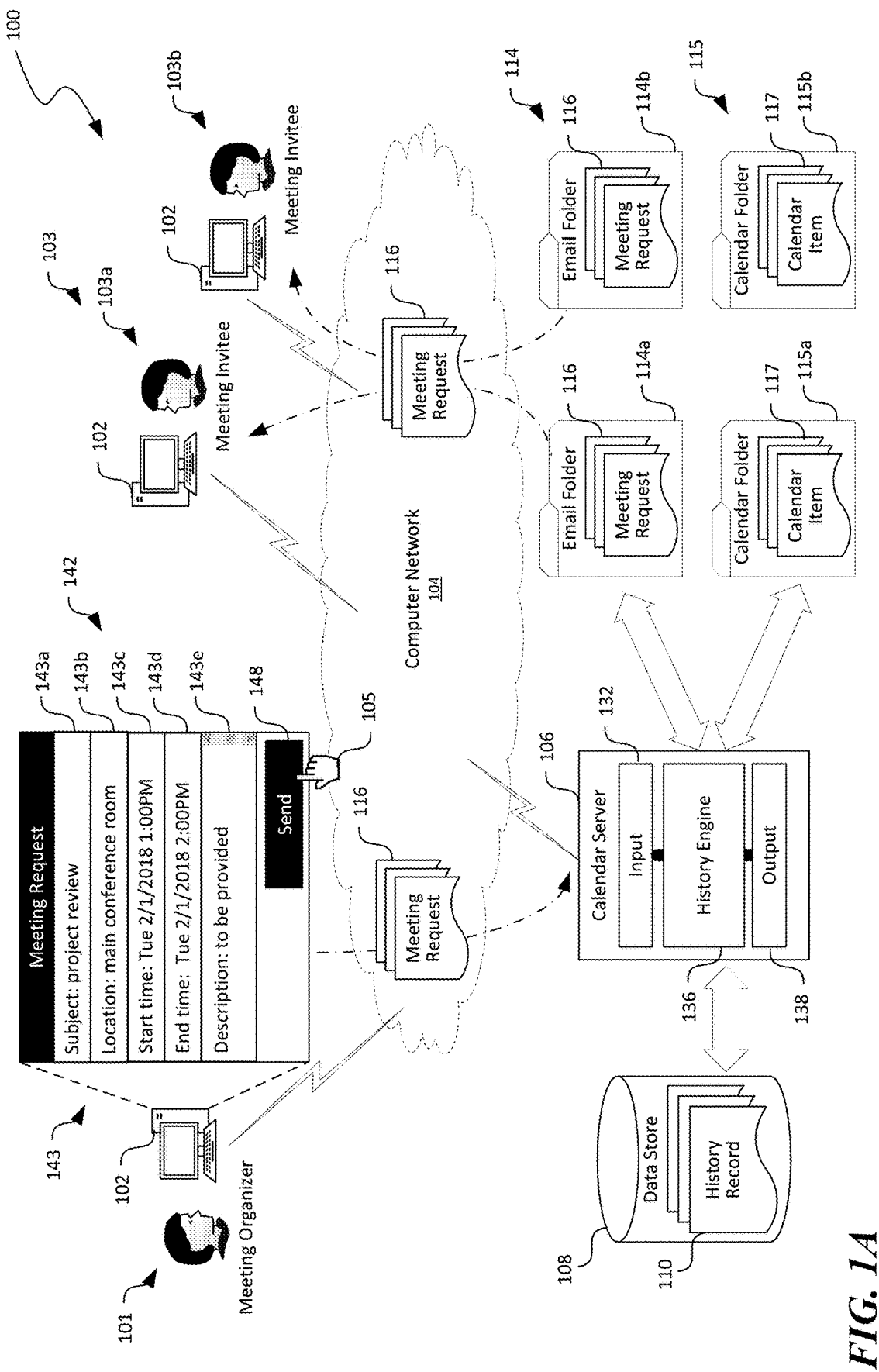
FIGS. 1A-1E are schematic diagrams illustrating an electronic calendar system implementing update tracking of calendar items during certain operation stages in accordance with embodiments of the disclosed technology.

Certain embodiments of systems, devices, components, modules, routines, data structures, and processes for update tracking of calendar items in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "calendar server" generally refers to computer or server dedicated to running such software applications that are configured to provide an electronic version of a physical calendar to one or more users. Such applications typically can provide an email folder, an appointment book, an address book, and a contact list. For example, such applications can provide functionalities such as generating electronic meeting invitations/updates, receiving and notifying newly received meeting invitations, and mechanisms for accept, reject, or proposed new date/time for any received meeting invitations. Examples of such applications include Microsoft Exchange®, qmail, Exim, and sendmail. A calendar server can also be configured to provide a calendar folder for a user. The calendar folder can contain data representing "calendar items" such as meeting appointments, reminders, etc. The calendar folder can also be synchronized with a corresponding local calendar folder on a client device accessible by a user via a computer network such as the Internet.

Also used herein, the term "meeting invitation" generally refers to a digital data package containing data representing a request for a meeting with one or more invitees or other suitable types of attendees. A meeting request can contain structured or non-structured data representing various data fields. For instance, example data fields can include identification of a meeting organizer, a start date/time, an end date/time, a location, a meeting description, or other suitable attributes or details of a meeting or other suitable types of calendar items. As used herein, the term "meeting update" generally refers to a digital data packet containing data representing one or more changes to a start date/time, an end date/time, a location, a meeting description, or other suitable attributes or details of a meeting. Further used herein, the term "time of assignment" generally refers to a date/time at which a value is assigned to a corresponding attribute of a calendar item. For instance, when "Tue Feb. 1, 2018 1:00 PM" is assigned to a start date/time attribute at "Jan. 1, 2018," the time of assignment for the start date/time attribute would be "Jan. 1, 2018."

In certain electronic calendar systems, all meeting updates are transmitted as emails to each meeting invitee's inbox for action by the meeting invitees. Such updating technique, however, can have certain drawbacks. For example, when a large number of updates have been sent/received, determining one or more of which information has changed, when such a change occurred, and a sequence of changes, may be difficult to a meeting invitee. To sort out the large number of changes, the meeting invitee may need to manually browse through all of the incoming and outgoing emails related to the updates. Such manual browsing can be labor intensive, frustrating, and prone to error by, for instance, overlooking one or more updates.

Several embodiments of the disclosed technology can address at least some of the foregoing drawbacks by implementing a history engine in an electronic calendar system for tracking and surfacing history of calendar items. The history engine can be configured to track one or more updates related to an initial calendar item such as a meeting request. Upon receiving a user input for the tracked information, the history engine can be configured to retrieve the database record and surface the tracked information on a user interface, for instance, as a plot of symbols or words on a graph with an x-axis representing time of assignment and a y-axis representing values of the various attributes. Thus, by plotting all the updates to the calendar item, the history engine can provide a complete history of the calendar item. Such graphical representation can provide a direct and visual sequence of the various updates. As such, manually browsing through the update emails may be avoided. As a result, risks of errors such as overlooking one or more of the update emails may be reduced, as described in more detail below with reference to FIGS. 1A-5.

FIGS. 1A-1E are schematic diagrams illustrating a computing system 100 implementing intelligent management of calendar items during certain operation stages in accordance with embodiments of the disclosed technology. In FIG. 1A and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a computer network 104 interconnecting client devices 102 with a calendar server 106. The computer network 104 can include an intranet, a wide area network, the Internet, or other suitable types of network. The client devices 102 can individually correspond to a meeting organizer 101 and one or more meeting invitees 103 (shown in FIG. 1A as first and second meeting invitees 103a and 103b). Two meeting invitees 103 are shown in FIGS. 1A-1E for illustration purposes though the computing system 100 can be configured to accommodate any suitable number of meeting invitees 103.

Even though particular components of the computing system 100 are shown in FIG. 1A, in other embodiments, the computing system 100 can also include additional and/or different components or arrangements. For example, in certain embodiments, the computing system 100 can also include an email server (not shown) that is configured to receive, process, and forward emails from/to the client devices 102. In other embodiments, the data store 108 may be integrated into the calendar server 106. In further embodiments, the computing system 100 can also include additional network storage devices, additional servers, and/or other suitable components (not shown).

The client devices 102 can each include a computing device that facilitates corresponding meeting organizer 101 or meeting invitees 103 (collectively referred to herein as "meeting attendees") to access computing services provided by the calendar server 106 via the computer network 104. For example, in the illustrated embodiment, the client devices 102 individually include a desktop computer configured to execute suitable instructions to provide a web page, an email client, a calendar client, a contact list, or other suitable computing services. In other embodiments, the client devices 102 can also include laptop computers, tablet computers, smartphones, or other suitable computing devices.

As shown in FIG. 1A, the calendar server 106 can be interconnected with or otherwise have access to email folders 114 and calendar folders 115 corresponding to the meeting attendees. The email folders 114 can contain copies of emails such as meeting request 116 while the calendar folders 115 can contain copies of calendar items 117, such as a scheduled meeting. In the illustrated example, only first and second email folders 114a and 114b and first and second calendar folders 115a and 115b individually corresponding to the first and second meeting invitees 103a and 103b are shown for illustration purposes. In other examples, an email folder 114 and a calendar folder 115 can also be provided to the meeting organizer 101. In further examples, the calendar server 106 can also be interconnected with or otherwise have access to additional email and/or calendar folders 114 and 115.

The calendar server 106 can also be interconnected to a data store 108 containing one or more history records 110 individually having data representing one or more sets of values of attributes of a calendar item and corresponding date/time at which the values are assigned to the corresponding attributes. In accordance with certain embodiments of the disclosed technology, various changes to values of attributes corresponding to a calendar item 117 can be tracked and stored in the data store as history records 110, as described in more detail below. An example data schema suitable for the history records 110 is described below in more detail with reference to FIG. 3.

In accordance with aspects of the disclosed technology, the calendar server 106 can be configured to track and surface history of calendar items 117 in a graphical form to the meeting attendees upon request. As shown in FIG. 1A, the calendar server 106 can include one or more processors 304 (shown in FIG. 5) and a memory 306 (shown in FIG. 5) containing instructions executable by the one or more processors to cause the calendar server 106 to provide an input component 132, an history engine 136, and an output component 138 operatively coupled to one another. Though particular components of the calendar server 106 are shown in FIG. 1A, in other embodiments, the calendar server 106 can also include network interface components, database management components, or other suitable types of components.

The input component 132 can be configured to receive a meeting request 116 from the client device 102 corresponding to the meeting organizer 101 via the computer network 104. As shown in FIG. 1A, in certain embodiments, the meeting organizer 101 can generate and transmit a meeting request 116 via a user interface 142 displayed on the client device 102. The user interface 142 can be a part of a web page of a calendar service (e.g., Google Calendar®) surfaced in a web browser or a part of a standalone calendar client (e.g., Microsoft Outlook®). In other embodiments, the meeting organizer 101 can generate and transmit the meeting request 116 via an application on a mobile device or in other suitable manners.

The user interface 142 can include multiple data fields 143 containing parameters or attributes of a requested meeting configurable by the meeting organizer 101. In the example illustrated in FIG. 1A, the data fields 143 include a subject field 143a (i.e., "project progress review"), a location field 143b (i.e., "main conference room"), a start time field 143c (i.e., "Tue Feb. 1, 2018 1:00 PM"), an end time field 143d (i.e., "Tue Feb. 1, 2018 2:00 PM"), and a description field 143e (i.e., "to be provided"). The user interface 142 can also include an actuation element (e.g., "Send" button 148) actuation of which can cause a web service or application corresponding to the user interface 142 to generate and transmit a meeting request 116 with the foregoing values of attributes to the calendar server 106. In other embodiments, the user interface 142 can also include data fields 143 for configuring reminder periods, time zones, meeting notes, or other suitable parameters or attributes.

The input component 132 can then be configured to receive and optionally pre-process the received meeting request 116. For instance, in certain embodiments, the input component 132 can be configured to authenticate the meeting request 116 based on digital certificate attached to the meeting request 116. In other embodiments, the input component 132 can be configured to determine whether the meeting request 116 is actually from the meeting organizer 101 based on, for example, a public key of the meeting organizer 101. In further embodiments, the input component 132 can also be configured to verify that the meeting request 116 is in an acceptable data format, contains necessary data values, and/or perform other suitable operations on the meeting request 116. Upon completion of optional pre-processing, the input component 132 (or in cooperation with an email server) can forward the meeting request 116 to the email folders 114 and client devices 102 of the meeting invitees 103, as shown in FIG. 1A.

Also shown in FIG. 1A, upon the meeting invitees 103 receiving the meeting request 116, for example, the output component 138 can be configured to create and store a calendar item 117 in the calendar folders 115 of the respective meeting invitees 103 even if the meeting invitees 103 do not accept or decline the meeting request 116. The calendar items 117 can each include the values of attributes contained in the multiple data fields 143 that are included in the meeting request 116 as well as reminders, classifications, categories, or other suitable information regarding the calendar items 117.

Figure 1B:
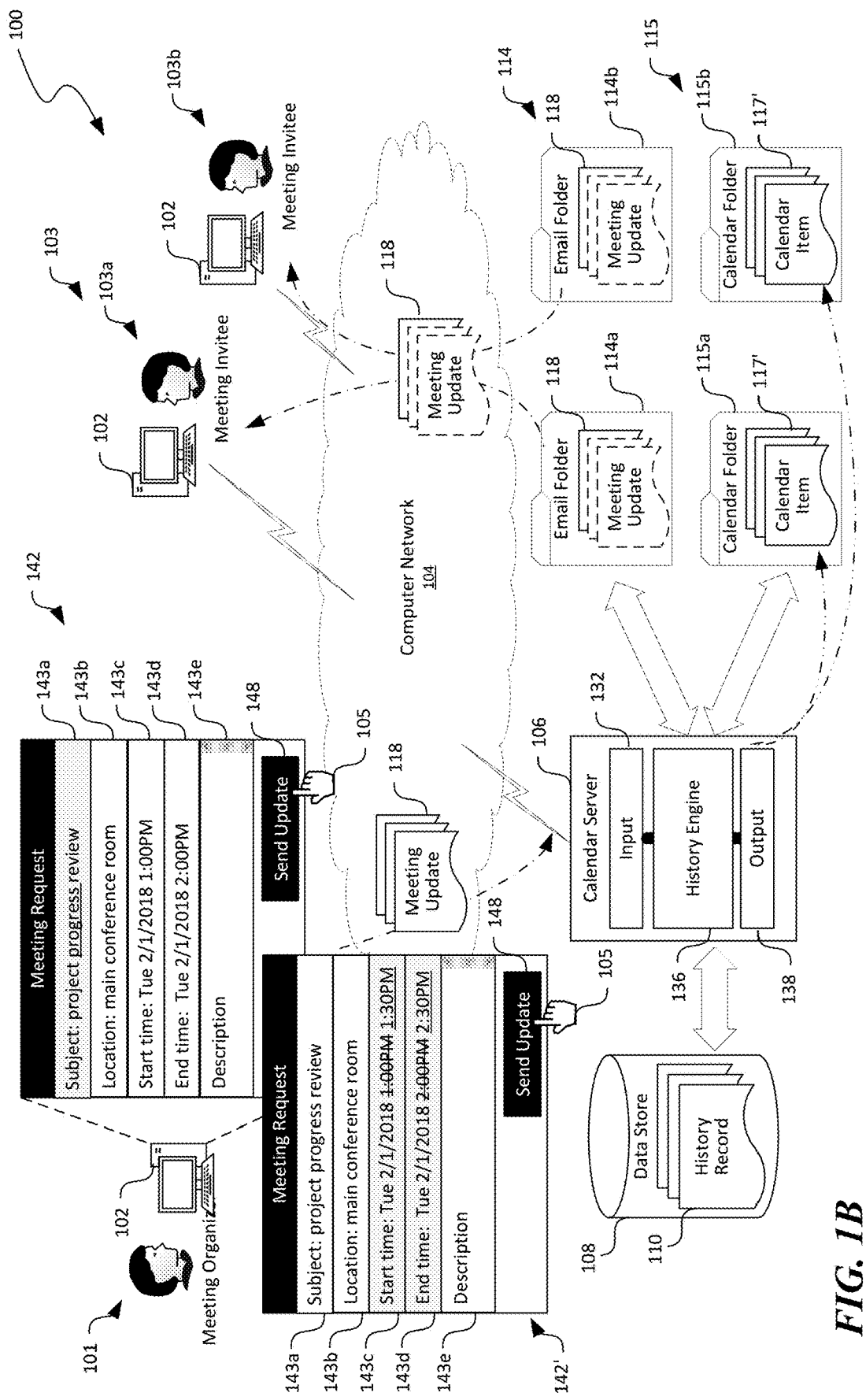

The calendar items 117 stored in the calendar folders 115 may be updated from time to time. For example, as shown in FIG. 1B, the meeting organizer 101 may decide to modify the subject field 143a to replace, for instance, "project review" with "project progress review." Later on, the meeting organizer 101 can also decide to modify the start date/time and the end date/time 143c and 143d from "1:00 PM" to "1:30 PM" and from "2:00 PM" to "2:30 PM," respectively. Upon receiving actuation on the "Send Update" button 148 (as represented by the cursor 105), meeting updates 118 corresponding to the foregoing modifications can be generated and transmitted to the calendar server 106. In FIG. 1B, particular modifications to values in the various attributes are shown for illustrations purposes. In other embodiments, additional and different modifications may also be accommodated.

Upon receiving the meeting updates 118, the input component 132 can perform the optional pre-processing described above and forward the meeting updates 118 to the history engine 136 for update tracking. In certain embodiments, the history engine 136 can be configured to identify one or more of the attributes that have modified values. For example, as shown in FIG. 1B, the history engine 136 can identify from one of the meeting updates 118 that the subject has a new value, i.e., "project progress review." The history engine 136 can also identify from another meeting update 118 that the start and end date/time have new values, i.e., "1:30 PM" and "2:30 PM," respectively.

Upon identifying the one or more attributes that have new values, the history engine 136 can be configured to modify the corresponding calendar items 117'. As such, the calendar items 117' can have the new values of the one or more attributes. In certain embodiments, the calendar items 117' can be modified with the new values upon acceptance by the meeting invitees 103. In other embodiments, the calendar items 117' can be modified without acceptance by the meeting invitees 103. In further embodiments, the calendar items 117' can be modified in other suitable manners.

The history engine 136 can also be configured to create or modify an history record 110 in the data store 108 that corresponds to the calendar item 117. The history record 110 can include data fields that record original and modified values for the one or more attributes as well as a date/time at which the values are modified. For instance, the history record 110 can include an entry for the subject having a value field containing data representing "project progress review" and a date/time of "Jan. 15, 2018 11:00 AM" at which the value field was modified. Similarly, the history record 110 can also include another entry for the start date/time having a value field containing data representing "Tue Feb. 1, 2018 1:30 PM" and a date/time of "Jan. 18, 2018 10:00 AM" at which the value field of the start date/time was modified.

Under certain circumstances, the meeting invitees 103 may not be able to track all the changes to the initially scheduled meeting as represented by the calendar items 117'. For instance, as shown in FIG. 1B, the meeting updates 118 forwarded to the meeting invitees 103 may not have been read, as represented by dashed lines. As such, even though the one or more attributes of the calendar items 117' can be updated with new values, the meeting invitees 103 may not be aware of how and when such changes occurred.

Figure 1C:
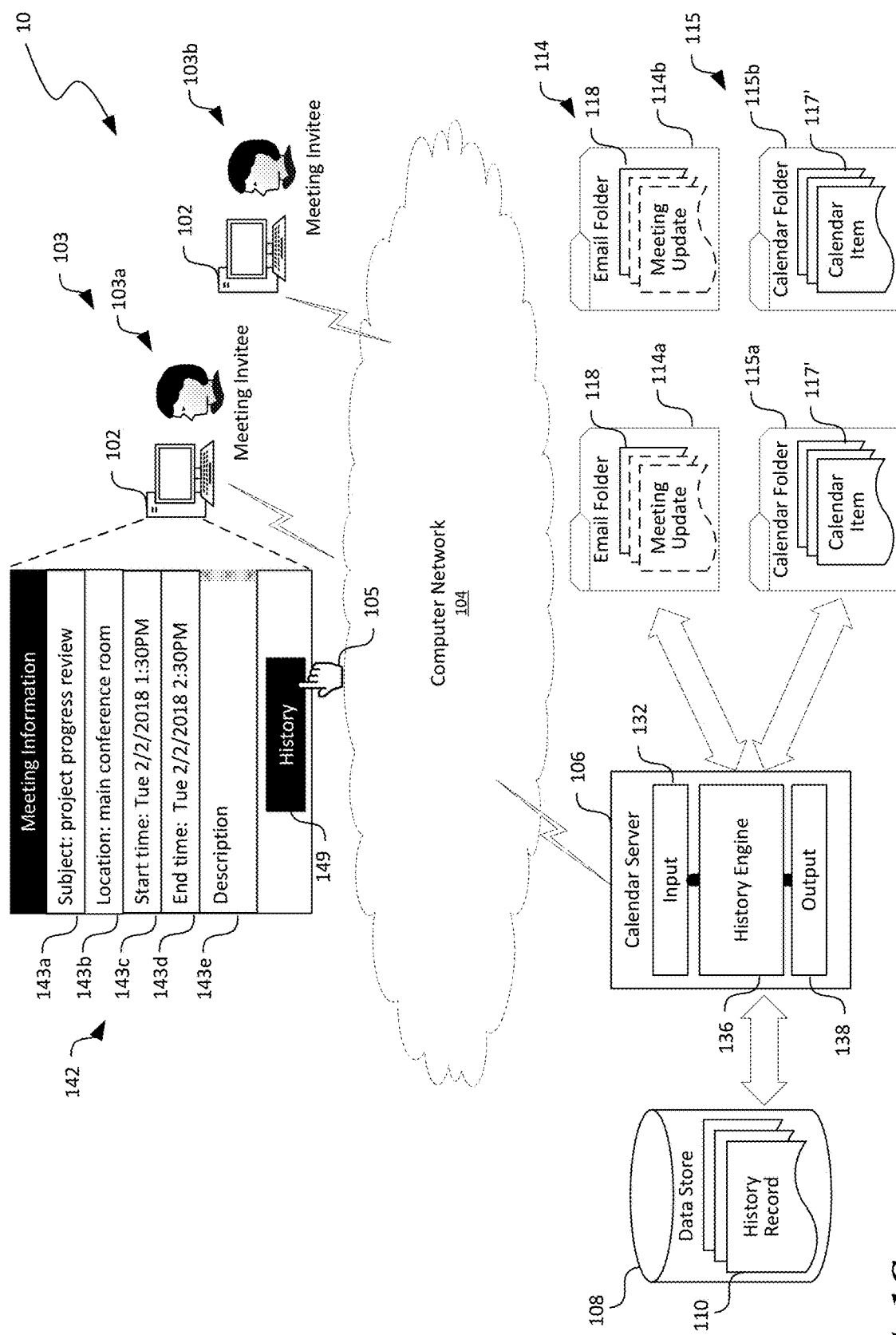

To address the foregoing and other drawbacks, the history engine 136 can also be configured to surface an history of the calendar items 117' to the meeting invitees 103. For instance, as shown in FIG. 1C, upon receiving a request, values of the various attributes of the calendar item 117' can be surfaced on the user interface 142. The user interface 142 can also include an interface element, for instance, a button labeled "History" 149 configured to trigger surfacing a history of the calendar item 117'. For example, upon receiving an input to the button labeled "History" 149, the history engine 136 can be configured to retrieve an history record 110 corresponding to the calendar item 117' from the data store 108. In other embodiments, the same or similar interface element can also be implemented in the meeting request 116 and/or the meeting update 118. Actuation of such interface element can cause the history engine 136 to retrieve and surface the history of the calendar item 117' on or prior to an arrival date of the meeting request 116 and/or the meeting update 118.

Figure 1D:
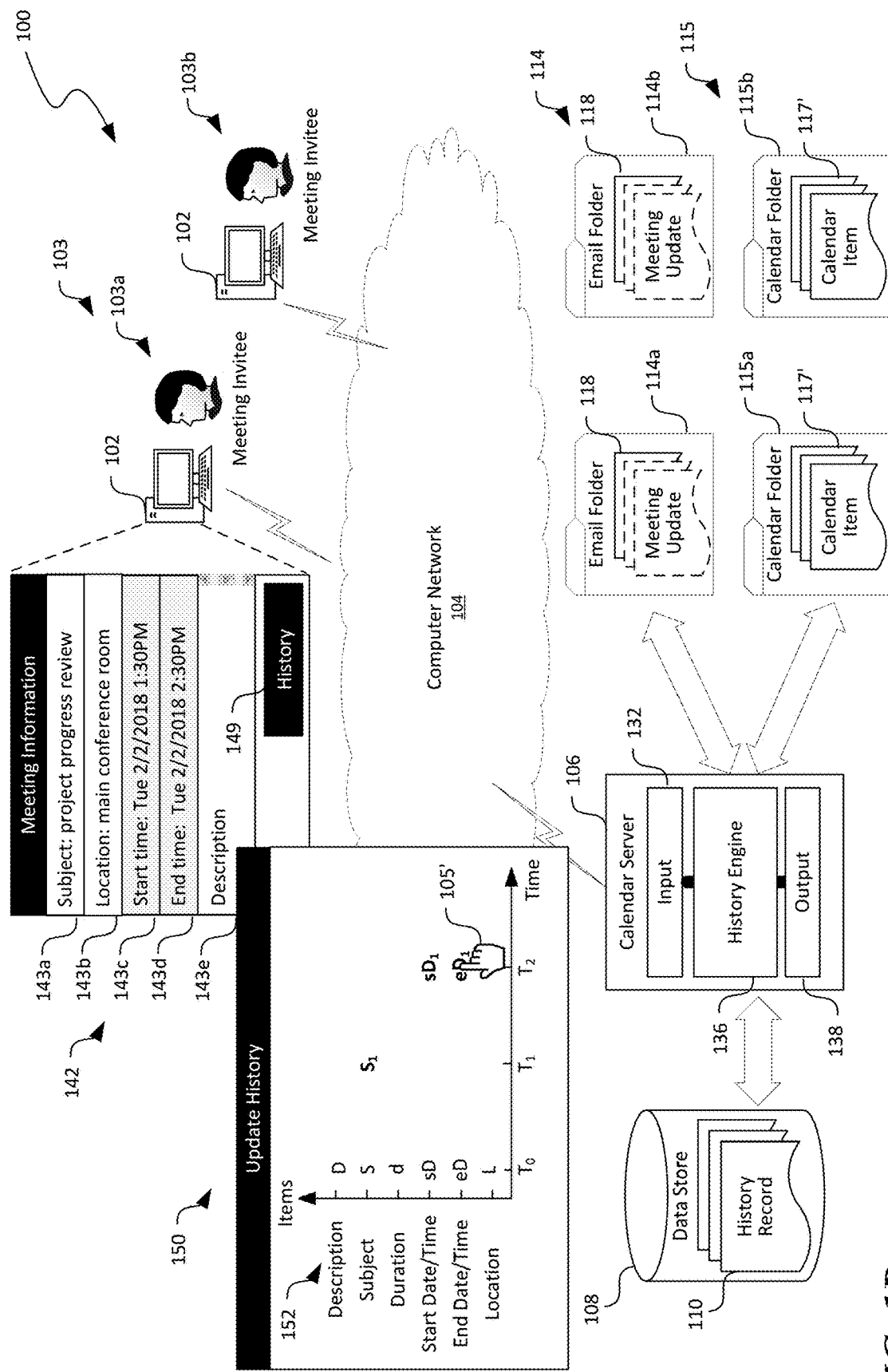

As shown in FIG. 1D, the history engine 136 can also be configured to surface a sequence of changes to various attribute(s) of the calendar item 117' on a user interface 150, such as a pop-up window on top of the user interface 142. In one embodiment, the history can be rendered and surfaced as symbols, words, or other suitable types of interface elements on a scatter plot 152 with an x-axis representing time of assignment and a y-axis representing the various attributes. For instance, as shown in FIG. 1C, the x-axis can have an origin of a reference date/time (not shown). The y-axis can have the various attributes of the calendar item 117' arranged along the y-axis. For example, the attributes can include "Description," "Subject," "Duration," "Start Date/Time," "End Date/Time," and "Location" as shown in FIG. 1D. In other examples, additional and/or different attributes may also be surfaced on the scatter plot 152 in any suitable orders. As such, datapoints on the scatter plot 152 can each have a value of date/time along the x-axis and a value of corresponding attributes along the y-axis.

In one implementation, the various values can be represented by a letter. For example, as shown in FIG. 1D, "D" can be used for a description of the calendar item. "S" can be used for a subject. Lower case "d" can be used for a duration. "T" can be used for a date/time. "L" can be used for a location. In further implementations, the various values can also be represented by actual values or truncated values. For example, a shortened description can be used to represent the description of the calendar item. A time period (e.g., "1 HR") can be used to represent the duration. In yet further implementations, the various values can be represented using emojis, pictures, images, or other suitable user interface elements. In other implementations, the various values of the attributes can be represented by a star, a cross, an asterisk, a square, a circle, a triangle, or other suitable types of symbol, examples of which are described in more detail below with reference to FIGS. 2A and 2B.

Based on the multiple values of the foregoing attributes in the retrieved database record, the history engine can plot multiple datapoints on the scatter plot corresponding the multiple values and values of date/time when the values changed. For example, a datapoint "S1" can be plotted to represent when the value of the subject was changed at "T1" from "project review" to "project progress review." Another datapoint "sD1" can be plotted to represent when the value of the start date/time was changed at "T2." A further datapoint "eD1" can be plotted to represent when the value of the end date/time was changed at "T2."

The history engine can then be configured to traverse the entire database record 110 to determine if additional values of the same or different attributes have been detected. If additional values have been detected, the history engine 136 can be configured to repeat the foregoing operations to plot additional datapoints on the scatter plot 152. Otherwise, the history engine can be configured to indicate that all of the values of the attributes have been represented by, for instance, surfacing a pop-up window (not shown). In other embodiments, the various values of the attributes can be surfaced as a histogram or other suitable types of diagrams.

Figure 1E:
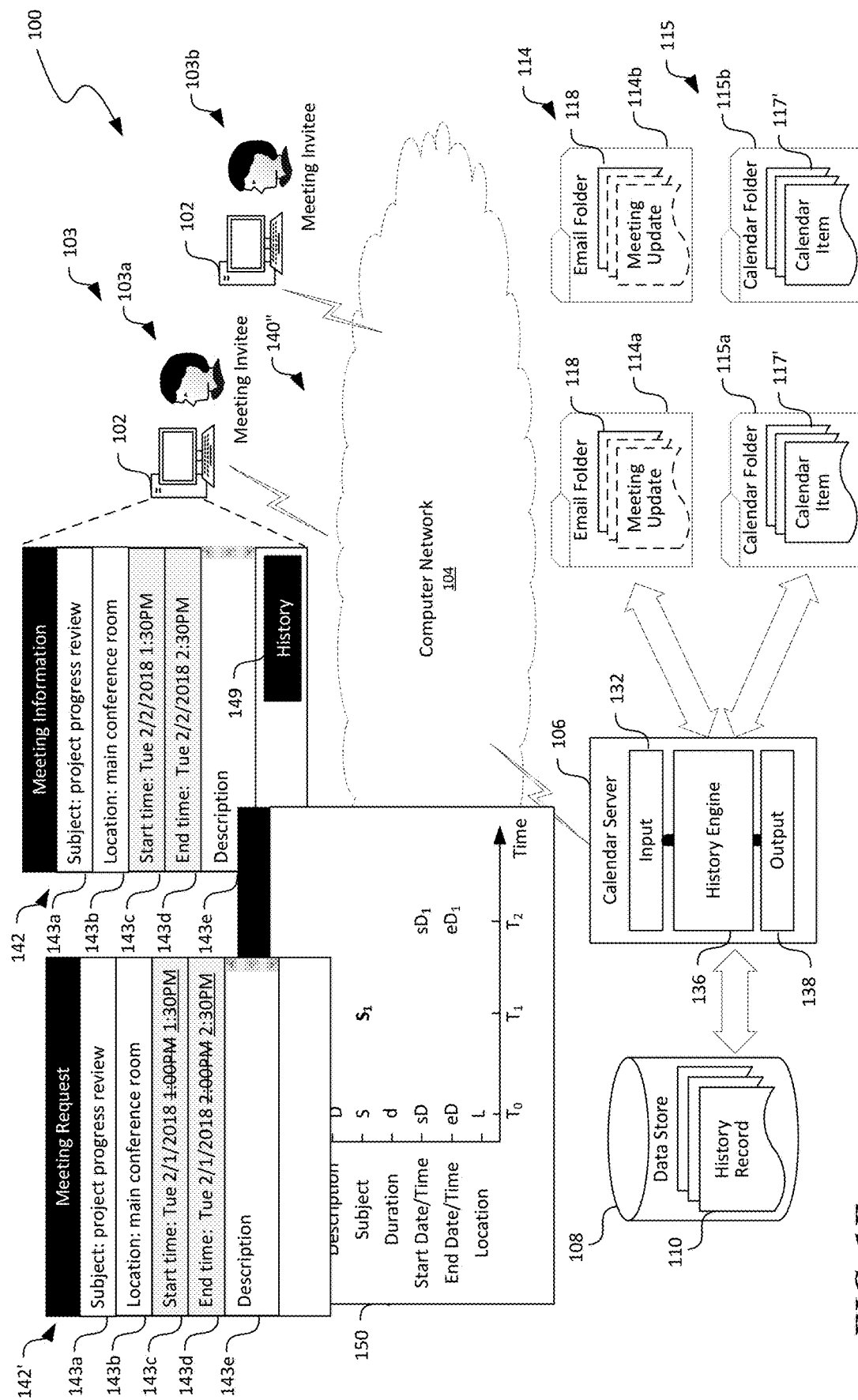

In certain embodiments, the history engine 136 can be configured to surface the datapoints representing the changes with different appearances based on whether a corresponding meeting update has been read, responded to, or otherwise processed by the meeting invitees 103. For instance, in the example shown in FIG. 1D, the first meeting invitee 103a has not read the meeting update 118 related to the change in subject, start date/time, and end date/time. As such, the history engine can be configured to represent the new values related to the subject (i.e., "S1"), start date/time (i.e., "sD1"), and end date/time (i.e., "eD1") in a bold face font. In other examples, the history engine 136 can also be configured to output or surface the foregoing new values in an underlined font or other suitable types of font, and/or with additional symbols proximate to the surfaced datapoints. Examples of suitable symbols can include exclamation, question, or other suitable types of marks. In further embodiments, upon receiving an input (e.g., a click as represented by the cursor 105') on one of the surfaced datapoints (e.g., "eD1"), the history engine 136 can be configured to locate and surface the corresponding meeting update 118 to the first meeting invitee 103a in another user interface 142', as shown in FIG. 1E. Subsequent to detecting that the first meeting invitee 103a has read the meeting update 118, the appearance of the originally surfaced datapoints (e.g., "sD1" and "eD1") on the scatter plot 152 can be modified to indicate that the meeting update 118 has been read. In the illustrated example, the surface datapoints are modified to be in a plain font.

Several embodiments of the disclosed technology can improve efficiencies in providing update information of calendar items 117 to meeting attendees by tracking various updates related to a calendar item 117 and surface the tracked updates in, for instance, a scatter plot 152 or other suitable graphical forms. When an update to a calendar item 117 is detected, an additional datapoint can be surfaced and plotted on the scatter plot 152 to represent a value of the update and a date/time at which the update was received, transmitted, or applied to the calendar item 117. Thus, by iterating through all the values of attributes in the calendar item 117, a complete history to the calendar item 117 can be graphically represented to meeting attendees. Such graphical representation can provide a direct and visual sequence of the various updates. As such, manually browsing through the meeting updates may be avoided. As a result, risks of errors such as overlooking one or more of the update emails may be reduced.

Figure 2A:
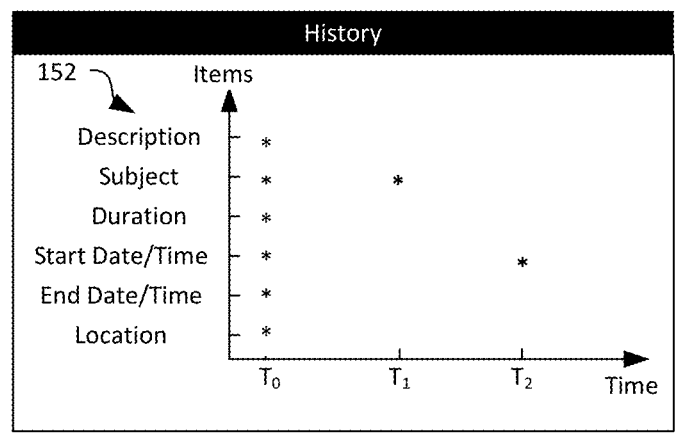
FIGS. 2A and 2B are example user interfaces suitable for surfacing tracked updates to calendar items in a graphical user interface in accordance with embodiments of the disclosed technology.
Figure 2B:
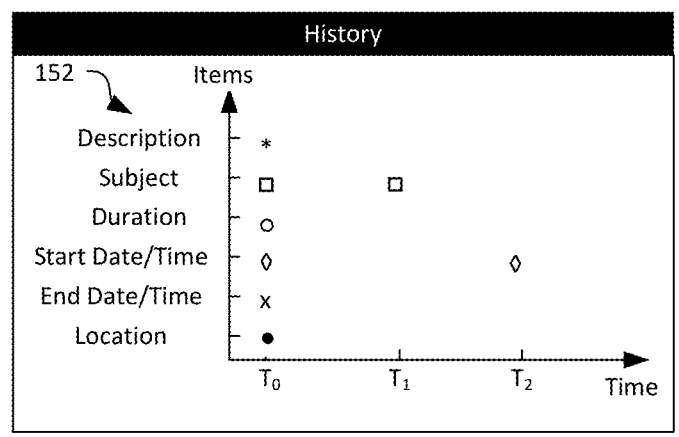

FIGS. 2A and 2B are example user interfaces suitable for surfacing tracked updates to calendar items in a graphical user interface in accordance with embodiments of the disclosed technology. As shown in FIG. 2A, a scatter plot 152 is surfaced to graphically represent tracked updates of calendar items. In particular, various values of attributes of the calendar item are plotted on the scatter plot with respect to time using asterisks. In other examples, as shown in FIG. 2B, each of the attributes may also be represented by different symbols. For instance, an asterisk, a square, a circle, a diamond, a cross, and a dot are used to represent "Description," "Subject," "Duration," "Start Date/Time," "End Date/Time," and "Location," respectively.

Figure 3:
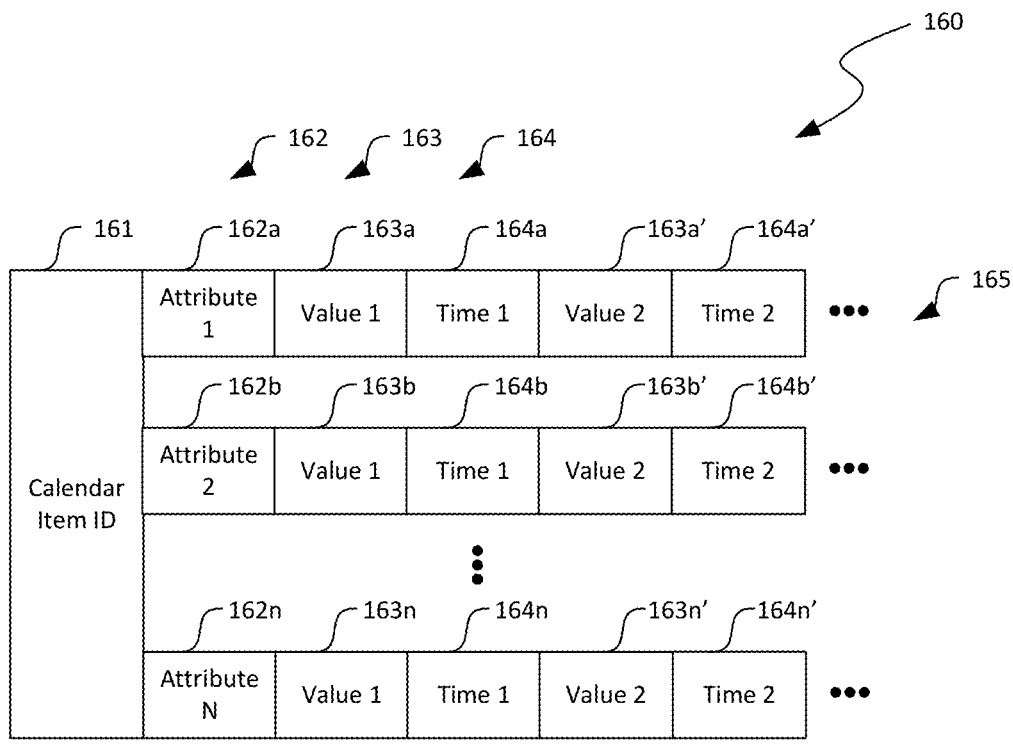
FIG. 3 is a schematic diagram illustrating an example data schema suitable for an history record in accordance with embodiments of the disclosed technology.

FIG. 3 is a schematic diagram illustrating an example data schema 160 suitable for an history record in accordance with embodiments of the disclosed technology. As shown in FIG. 3, the data schema 160 can include a calendar item ID field 161 configured to contain data representing an identifier of a calendar item, and multiple sets 165 of attribute, value, and time fields 162, 163, and 164, respectively. For instance, a first set 165 can include an attribute 1 field 162a, a value 1 field 163a, a time 1 field 164a, a value 2 field 163b, and a time 2 field 164b. The attribute 1 field 162a can be configured to contain data representing an attribute of the calendar item, such as "Description," "Subject," "Duration," "Start Date/Time," "End Date/Time," or "Location." The value 1 field 163a can be configured to contain a value of the attribute. The time 1 field 164a can be configured to contain a value representing a date/time at which the value is applied to the attribute.

Figure 4A:
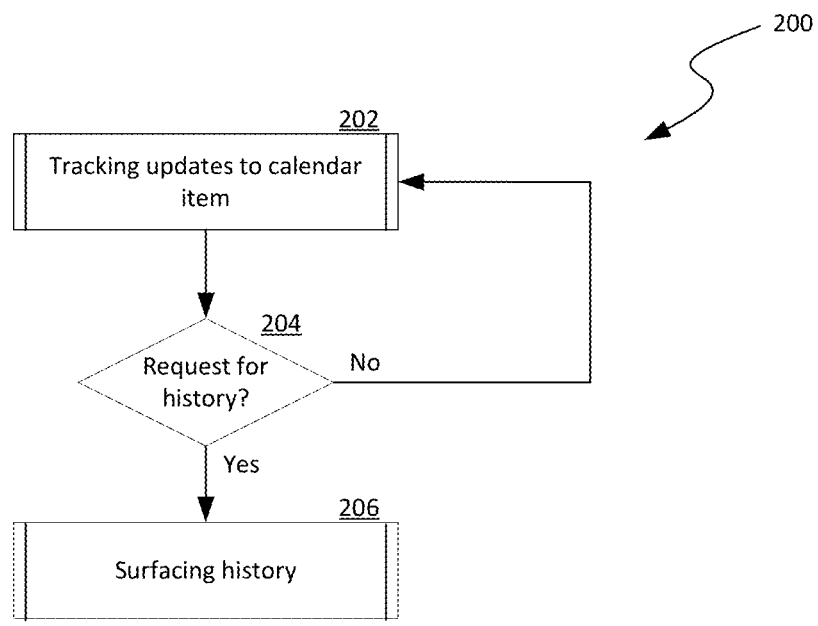
FIGS. 4A-4C are flowcharts illustrating processes of update tracking of calendar items in accordance with embodiments of the disclosed technology.
Figure 4B:
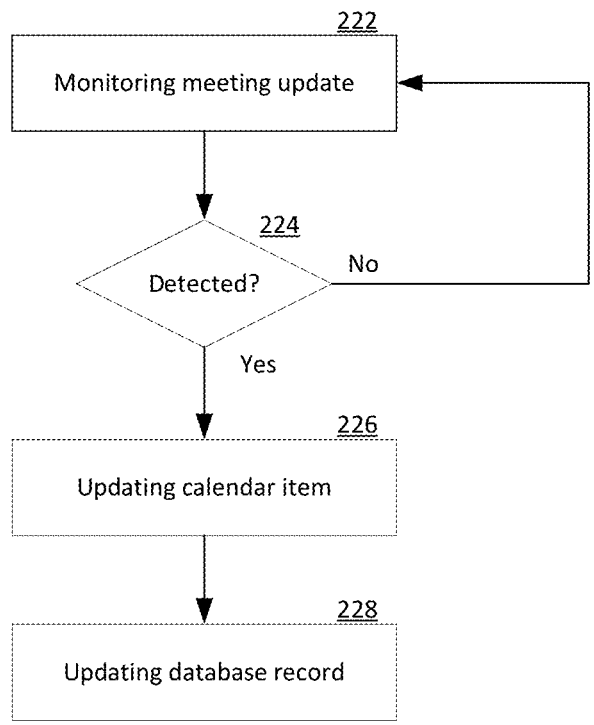
Figure 4C:
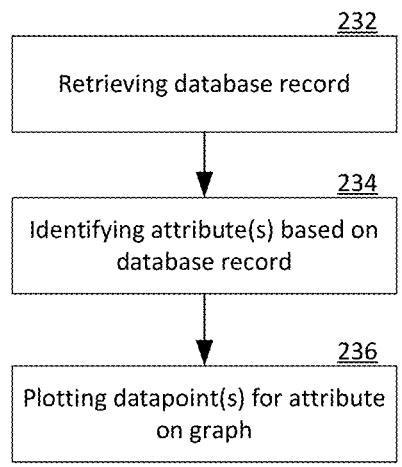

FIGS. 4A-4C are flowcharts illustrating processes of update tracking of calendar items in accordance with embodiments of the disclosed technology. Though the process is described in the context of the computing system 100 of FIGS. 1A-1E, embodiments of the process can also be implemented in other computing systems with additional and/or different components.

As shown in FIG. 4A, a process 200 can include tracking updates to a calendar item at stage 202. The tracked updates can include values to one or more attributes of the calendar item. Example operations of tracking updates are described below with reference to FIG. 4B. The process 200 can then include decision stage 204 to determine whether a request for surfacing an history of the calendar item is received. In response to determining that a request for surfacing an history of the calendar item is not received, the process 200 revers to tracking updates to calendar items at stage 202. Otherwise, the process 200 proceeds to surfacing the history at stage 206. Example operations of tracking updates are described below with reference to FIG. 4C.

As shown in FIG. 4B, example operations of tracking updates to a calendar item can include monitoring meeting updates at stage 222. Meeting updates can be monitored based on received emails or via other suitable techniques. The operations can then include a decision stage to determine whether a meeting update is detected. In response to determining that a meeting update is not detected, the operations revert to monitoring for meeting updates at stage 222. Otherwise, the operations proceed to updating the calendar item at stage 226, as described in more detail above with reference to FIG. 1B. The operations can further include updating a corresponding database record (e.g., the history record 110 in FIG. 1B) at stage 228.

As shown in FIG. 4C, example operations of surfacing the history can include retrieving a database record corresponding to the calendar item at stage 232 and identifying one or more attributes of the calendar item based on the retrieved database record at stage 234. The operations can then include plotting one or more datapoints corresponding to values of the attributes on a graph at stage 236. Examples of plotting the datapoints are described above in more detail with reference to FIG. 1C. The operations can then include a decision stage 238

Figure 5:
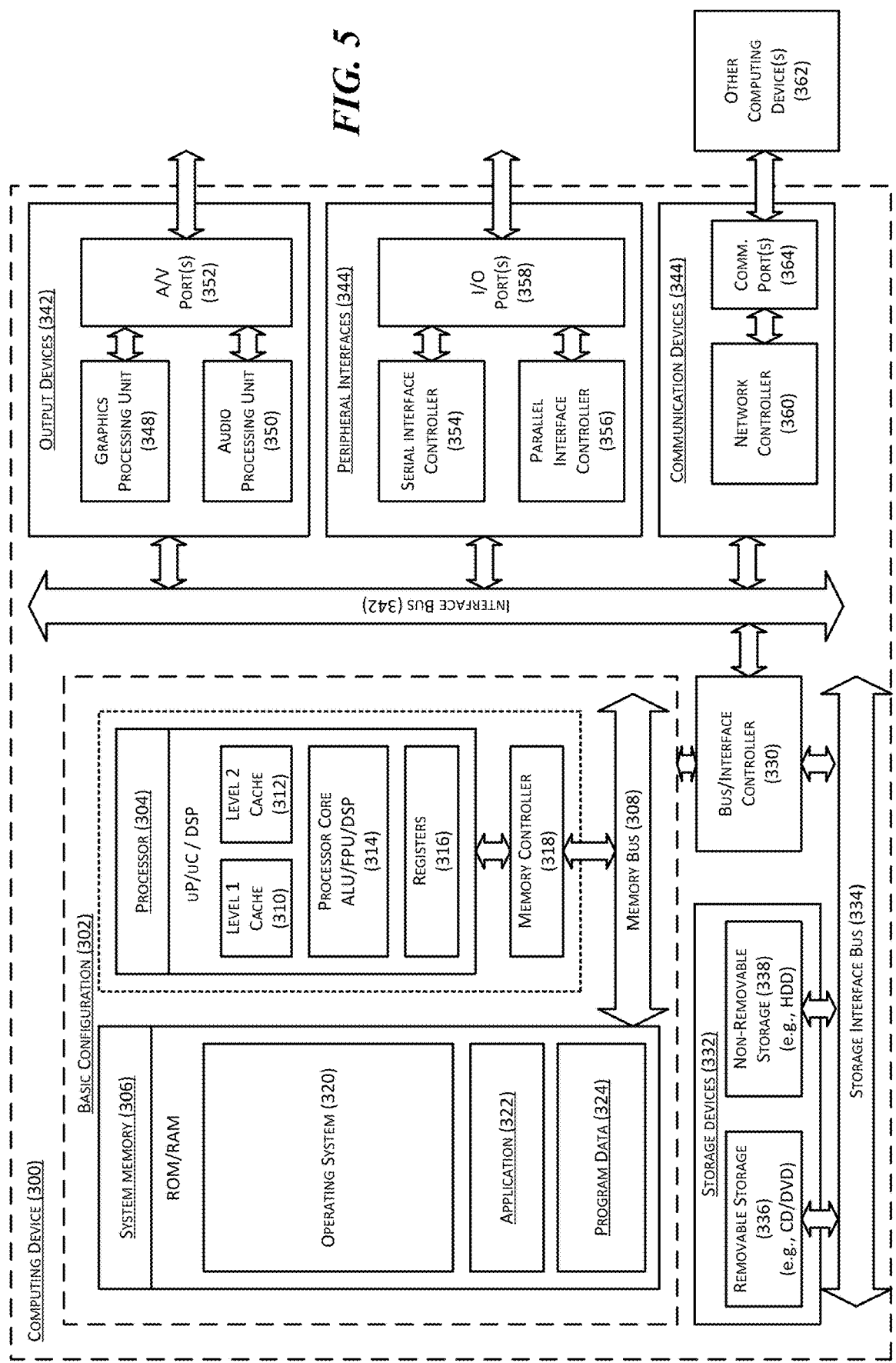
FIG. 5 is a computing device suitable for certain components of the electronic calendar system in FIGS. 1A-1E.

FIG. 5 is a computing device 300 suitable for certain components of the distributed computing system 100 in FIGS. 1A-1E. For example, the computing device 300 can be suitable for the calendar server 106 or the client devices 102 of FIGS. 1A-1E. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for update tracking of calendar items in an electronic calendar book of a user maintained by an electronic calendar system, the method comprising:
 receiving a request for a history of a calendar item in the electronic calendar book of the user; and
 in response to receiving the request,
  retrieving a database record corresponding to the calendar item and containing data representing a first value of an attribute of the calendar item, a first time at which the first value is assigned to the attribute, a second value different than the first value, and a second time at which the second value is assigned to the attribute to replace the first value, the second time being later than the first time; and
  upon retrieving the database record, surfacing the data of the retrieved database record corresponding to the calendar item on a graphical user interface having a first axis representing the attribute and a second axis representing time of assignment, wherein the surfaced data is represented by:
   a first datapoint corresponding to the first value along the first axis and the first time along the second axis; and
   a second datapoint corresponding to the second value along the first axis and the second time along the second axis.

2. The method of claim 1 wherein the attribute includes one of a start date/time, an end date/time, a location, a subject of discussion, a duration, a description, a list of attendees, or an attached document related to the calendar item.

3. The method of claim 1, further comprising:
 upon retrieving the database record,
  determining whether an update email corresponding to the second value of the attribute has been read by the user; and
  in response to determining that the update email corresponding to the second value of the attribute has not been read, surfacing the second datapoint with an appearance different than that of the first datapoint.

4. The method of claim 1, further comprising:
 upon retrieving the database record,
  determining whether an update email corresponding to the second value of the attribute has been read by the user; and
  in response to determining that the update email corresponding to the second value of the attribute has been read, surfacing the second datapoint with an appearance that is the same as that of the first datapoint.

5. The method of claim 1, further comprising:
 receiving an input on the surfaced second datapoint on the graphical user interface; and
 in response to receiving the input,
  locating an update email corresponding to assigning the second value to the attribute; and
  surfacing the located update email to the user.

6. The method of claim 1, further comprising:
 upon retrieving the database record,
  determining whether an update email corresponding to the second value of the attribute has been read by the user; and
  in response to determining that the update email corresponding to the second value of the attribute has not been read, surfacing the second datapoint with an appearance different than that of the first datapoint;
 receiving an input on the surfaced second datapoint on the graphical user interface; and
 in response to receiving the input,
  locating an update email corresponding to assigning the second value to the attribute;
  surfacing the located update email to the user; and
  surfacing the second datapoint with another appearance that is the same as that of the first datapoint.

7. The method of claim 1 wherein:
 the attribute is a first attribute; and
 surfacing the data includes surfacing one or more additional datapoints corresponding to a second attribute along with the first and second datapoints of the first attribute.

8. The method of claim 1, further comprising:
 detecting reception of an email containing an update to the calendar item, the update containing a third value corresponding to the attribute; and
 in response to detecting the reception of the email containing the update, updating the calendar item to assign the third value to the attribute of the calendar item; and updating the database record to include the third value assigned to the attribute and a third time corresponding to one of a time of reception of the email containing the update or a time of updating the calendar item in the electronic calendar system.

9. The method of claim 1, further comprising:

surfacing, on a user interface, the calendar item to the user with the second value of the attribute; and wherein receiving the request includes receiving the request via the user interface for the history of the calendar item in the electronic calendar book of the user.

10. A computing device, comprising:

a processor; and a memory operatively coupled to the processor, the memory containing an email folder and a calendar folder for a user and instructions executable by the processor to cause the computing device to:

upon receiving a request for an history of a calendar item in the electronic calendar book of a user, retrieve a database record corresponding to the calendar item, the database record containing data representing an attribute of the calendar item, a first value of the attribute, a first time at which the first value is assigned to the attribute, a second value different than the first value, and a second time at which the second value is assigned to the attribute, the second time being later than the first time; and upon retrieving the database record, surfacing, on a graphical user interface having a first axis representing the attribute and a second axis representing time of assignment, a first datapoint corresponding to the first value along the first axis and the first time along the second axis and a second datapoint corresponding to the second value along the first axis and the second time along the second axis.

11. The computing device of claim 10 wherein the attribute includes one of a start date/time, an end date/time, a location, a subject of discussion, a duration, a description, a list of attendees, or an attached document related to the calendar item.

12. The computing device of claim 10 wherein the memory includes additional instructions executable by the processor to cause the computing device to:

upon retrieving the database record, determine whether an update email corresponding to the second value of the attribute has been read by the user; and in response to determining that the update email corresponding to the second value of the attribute has not been read, surface the second datapoint with an appearance different than that of the first datapoint.

13. The computing device of claim 10 wherein the memory includes additional instructions executable by the processor to cause the computing device to:

upon retrieving the database record, determine whether an update email corresponding to the second value of the attribute has been read by the user; and in response to determining that the update email corresponding to the second value of the attribute has been read, surface the second datapoint with an appearance that is the same as that of the first datapoint.

14. The computing device of claim 10 wherein the memory includes additional instructions executable by the processor to cause the computing device to:

in response to receiving an input on the surfaced second datapoint on the graphical user interface, locate an update email corresponding to assigning the second value to the attribute; and surface the located update email to the user.

15. The computing device of claim 10 wherein the memory includes additional instructions executable by the processor to cause the computing device to:

upon retrieving the database record, determine whether an update email corresponding to the second value of the attribute has been read by the user; and in response to determining that the update email corresponding to the second value of the attribute has not been read, surface the second datapoint with an appearance different than that of the first datapoint; and in response to receiving an input on the surfaced second datapoint on the graphical user interface, locate an update email corresponding to assigning the second value to the attribute;

surface the located update email to the user; and modify the surfaced second datapoint with another appearance that is the same as that of the first datapoint.

16. The computing device of claim 10 wherein the memory includes additional instructions executable by the processor to cause the computing device to:

detect reception of an email containing an update to the calendar item, the update containing a third value corresponding to the attribute; and in response to detecting the reception of the email containing the update, update the calendar item to assign the third value to the attribute of the calendar item; and update the database record to include the third value assigned to the attribute and a third time corresponding to one of a time of reception of the email containing the update or a time of updating the calendar item in the electronic calendar system.

17. A method for update tracking of calendar items in an electronic calendar book of a user maintained by an electronic calendar system, the method comprising:

receiving a request for an history of a calendar item in the electronic calendar book of the user, the calendar item having an attribute including a start date/time, an end date/time, a location, a subject of discussion, a duration, a description, a list of attendees, or an attached document related to the calendar item; and in response to receiving the request, surfacing, on a graphical user interface having a first axis representing the attribute and a second axis representing time of assignment, a first datapoint corresponding to a first value of the attribute along the first axis and a first time, along the first axis, at which the attribute acquired the first value; and a second datapoint corresponding to a second value of the attribute along the first axis and, along the second axis, a second time at which the attribute acquired the second value to replace the first value.

18. The method of claim 17 the surfacing the first datapoint and the second datapoint includes:
   determining whether an update email corresponding to the first or second value of the attribute has been read by the user; and
   in response to determining that the update email corresponding to the first or second value of the attribute has not been read, surfacing the first or second datapoint with an appearance different than if the update email has been read.

19. The method of claim 17, further comprising:
   receiving an input on the surfaced first or second datapoint on the graphical user interface; and
   in response to receiving the input,
      locating an update email corresponding to the first or second value of the attribute; and
      surfacing the located update email to the user.

20. The method of claim 17 wherein:
   the attribute is a first attribute; and
   surfacing the data includes surfacing one or more additional datapoints corresponding to a second attribute along with the first and second datapoints of the first attribute.

\* \* \* \* \*